United States Patent [19]

Matsumoto et al.

[11] Patent Number: 5,122,561
[45] Date of Patent: Jun. 16, 1992

[54] DISPOSABLE MOLDINGS AND POLYMER COMPOSITIONS FOR THEIR PRODUCTION

[75] Inventors: Mitsuo Matsumoto, Kurashiki; Fumio Sanda, Yamato; Shigeru Sasaki, Takatsuki; Masaki Okazaki, Okayama, all of Japan

[73] Assignee: Kuraray Co., Ltd., Kurashiki, Japan

[21] Appl. No.: 631,444

[22] Filed: Dec. 21, 1990

[30] Foreign Application Priority Data

Dec. 21, 1989 [JP] Japan .................................. 1-334449
Dec. 29, 1989 [JP] Japan .................................. 1-340874

[51] Int. Cl.$^5$ .......................... C08K 5/13; C08K 5/12; C08L 37/00; C08F 134/02
[52] U.S. Cl. .................................... 524/323; 524/296; 524/298; 524/549; 526/270
[58] Field of Search ................ 524/323, 549, 296, 298; 526/270

[56] References Cited

U.S. PATENT DOCUMENTS 3,723,398  3/1973  Dowbenko ........................... 526/270

FOREIGN PATENT DOCUMENTS 1443778  5/1966  France ................................. 526/270

OTHER PUBLICATIONS

Journal of Chemical Society, p. 3766 (1954).
Journal of Polymer Science, vol. 49, p. 287 (1961).
Japanese Patent Unexamined Publication No. 1299/1978.
Nippon Kagaku Kaishi, No. 3, p. 610 (1973).
Polymer Journal, vol. 16, p. 415 (1984).
Polymer Preprints, vol. 24, p. 317 (1983).
Polymer Preprints, vol. 26, p. 253 (1985).
Polymer Preprints, vol. 27, p. 386 (1986).

*Primary Examiner*—Paul R. Michl
*Assistant Examiner*—Peter Szekely
*Attorney, Agent, or Firm*—Oblon, Spivak, McClelland, Maier & Neustadt

[57] ABSTRACT

Disposable moldings comprising a polymer (A) having a repeating structure unit in the main chain represented by the formula (I)

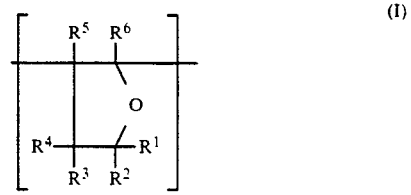

wherein $R^1$, $R^2$, $R^3$, $R^4$, $R^5$ and $R^6$ are respectively a hydrogen atom or a lower alkyl, and a polymer composition comprising the polymer (A). The moldings of the present invention disintegrate themselves due to decomposition of the polymer (A) in atmosphere, soil or water and do not cause any environmental pollution.

8 Claims, No Drawings

DISPOSABLE MOLDINGS AND POLYMER COMPOSITIONS FOR THEIR PRODUCTION

BACKGROUND OF THE INVENTION

The present invention relates to disposable moldings comprising specific polymers and/or polymer compositions thereof, and to polymers or polymer compositions for their production.

The disposable moldings according to the present invention are superior in mechanical strength and flexibility and besides, the moldings themselves have decomposability with time due to decomposition of the polymers constituting the same in atmosphere, soil, water, or the like.

In recent years, the proportion of plastic in wastes has been on the constant increase, and various problems in connection with the waste plastic, such as shortage of dumping site and high-performance incinerator, concern about noxious material generated by the incineration of plastic, problems in the aspect of fine view, etc. has been rapidly drawing public attention. Thus, provision of plastic products which decompose quickly and do not cause environmental pollution has been a public demand.

SUMMARY OF THE INVENTION

The object of the invention is to provide disposable plastic moldings which are excellent in mechanical properties, as well as in decomposability with time.

The present inventors have found that the moldings which are excellent in mechanical properties and are capable of disintegration due to lowering of the mechanical properties caused by the decomposition of the polymer comprised therein in atmosphere, soil, or water relatively in a short time, can be obtained from the polymers which have a tetrahydrofuran skeleton and their compositions, and developed the invention.

Thus, the invention provides:

(a) Disposable moldings which comprise one species selected from the group consisting of a polymer (A), a polymer composition (B), a polymer composition (C) and a polymer composition (D), wherein: the polymer (A) has a repeating structure unit in the main chain represented by the formula (I)

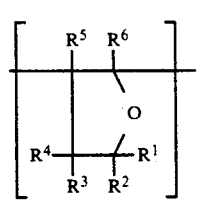

wherein $R^1$, $R^2$, $R^3$, $R^4$, $R^5$ and $R^6$ are respectively a hydrogen atom or a lower alkyl; the polymer composition (B) comprises the polymer (A) and a phenol compound of the formula (IV)

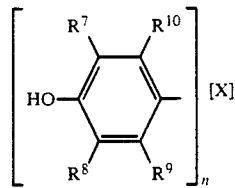

wherein $R^7$, $R^8$, $R^9$ and $R^{10}$ are respectively a hydrogen atom or a lower alkyl, at least one of $R^7$ and $R^8$ is tert-butyl, X is a hydrogen atom or an organic group and n is an integer of 1 to 4 corresponding to the number of the bonding site of [X];
the polymer composition (C) comprises the polymer (A) and a plasticizer; and
the polymer composition (D) comprises the polymer (A), a phenol compound of the formula (IV) above and a plasticizer.

(b) Polymer compositions comprising the polymer (A) and the phenol compound mentioned above.
(c) Polymer compositions comprising the polymer (A) and a plasticizer.
(d) Polymer compositions comprising the polymer (A), a phenol compound mentioned above and a plasticizer.

DETAILED DESCRIPTION OF THE INVENTION

The lower alkyl represented by $R^1$, $R^2$, $R^3$, $R^4$, $R^5$ and $R^6$ in the repeating unit (I) described above (hereinafter referred to generally as $R^{1-6}$) include, for example, methyl, ethyl, propyl, isopropyl, butyl, or the like. It is preferable that all of $R^{1-6}$ be a hydrogen atom or methyl and more preferable that all of $R^{1-6}$ be a hydrogen atom or an optional one of $R^{1-6}$ be methyl and the rest be a hydrogen atom.

As the preferred repeating unit (I) affording the polymer (A) in the invention, the following can be mentioned.

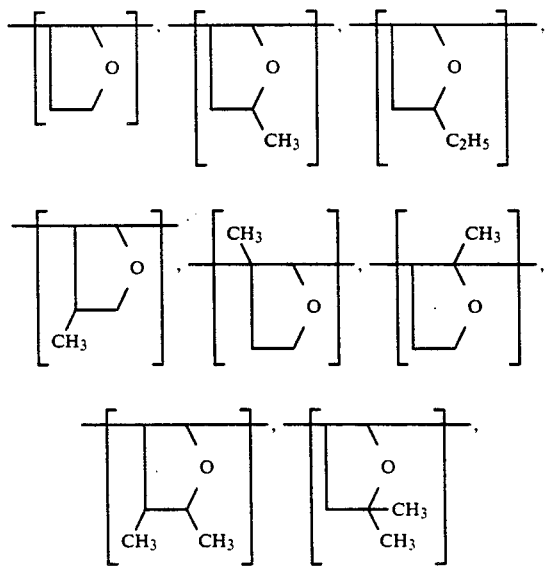

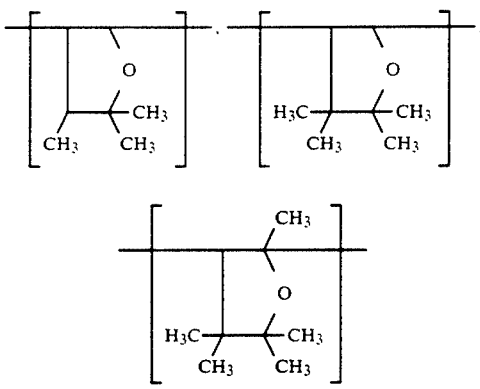

In the present invention, the polymer (A) may include repeating unit(s) (II) and/or (III) of the following formulas, which has the effect that the decomposition rate of the polymer (A) can be accelerated depending on the amount contained.

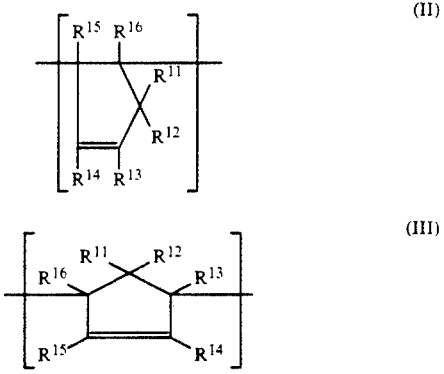

wherein $R^{11}$, $R^{12}$, $R^{13}$, $R^{14}$, $R^{15}$ and $R^{16}$ are respectively a hydrogen atom or a lower alkyl.

When the repeating unit(s) (II) and/or (III) are(is) contained, the molar ratio of the repeating unit (I) and the repeating unit(s) (II) and/or (III) is in the range between 20:80 and 95:5, preferably 30:70 and 90:10.

The lower alkyl represented by $R^{11}$, $R^{12}$, $R^{13}$, $R^{14}$, $R^{15}$ and $R^{16}$ in the repeating units (II) and (III) described above (hereinafter referred to generally as $R^{11-16}$) include, for example, methyl, ethyl, propyl, isoproyl, butyl, or the like. It is preferable that all of $R^{11-16}$ be a hydrogen atom or methyl and more preferable that all of $R^{11-16}$ be a hydrogen atom or an optional one of $R^{11-16}$ be methyl and the rest be a hydrogen atom.

As the repeating units (II) and (III), the following can be shown.

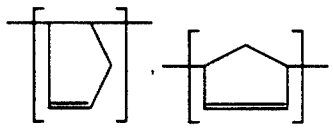

The polymer (A) may have only one species or 2 or more species of those exemplified above as the repeating unit (I). Further, the polymer (A) may have a structure unit other than the units (I), (II) and (III) as long as it is not detrimental to the physical properties of the polymer (A). That is, the polymer (A) may have a structure unit such as the unit (V) shown below in a small amount.

wherein $R^{17}$ is a lower alkyl such as methyl, ethyl, propyl, isopropyl, n-butyl, or the like.

As the polymer (A), those having a number-average molecular weight (relative to standard polystyrene) determined by gel permeation chromatography (hereinafter abbreviated as GPC) of 5,000–200,000 are preferred.

The polymer (A) normally possesses a glass transition temperature of not less than 120° C., sometimes not less than 125° C. depending on the species of the repeating unit (I). In addition, various moldings obtained from the polymer (A) are transparent with sufficient mechanical properties upon forming.

The polymer (A) can be prepared by subjecting a compound of the formula (VI)

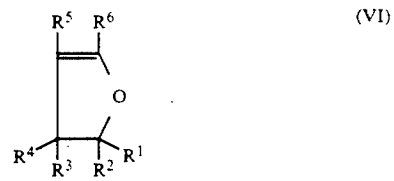

wherein $R^{1-6}$ are as defined above, to a known cationic polymerization reaction in the presence of a suitable polymerization initiator.

Examples of the polymerization initiator employed in the production of the polymer (A) include proton acids such as hydriodic acid, etc.; metal oxides such as chrome oxide, molybdenum oxide, etc.; halogens such as iodine, bromine, bromoiodine, etc.; boron halides such as boron fluoride, boron trifluoride ether complex, etc.; metal halides such as aluminium chloride, aluminium bromide, titanium tetrachloride, titanium tetrabromide, tin tetrachloride, iron trichloride, etc.; organometallic compounds such as ethylaluminum dichloride, diethylaluminum chloride, diethylaluminum bromide, diethylzinc, etc.; carbonium ion salts such as triphenylmethyl antimony hexachloride, triphenylmethyl tin pentachloride, or the like. The polymerization initiator is used in an amount of 0.01–10 mole %, preferably 0.05–2 mole % relative to the compound of the formula (VI).

The polymerization temperature ranges from −200° C. to 100° C., preferably from −100° C. to 50° C. The polymerization is normally conducted in an inert gas atmosphere such as nitrogen, argon, helium, or the like. The polymerization can be conducted in the absence of a solvent. However, it is preferably conducted in the presence of a solvent such as aromatic hydrocarbons (e.g. benzene, toluene, xylene, mesitylene, etc.), aliphatic hydrocarbons (e.g. hexane, heptane, octane, etc.), alicyclic hydrocarbons (e.g. cyclohexane, cyclooctane, etc.), hydrocarbon halides (e.g. methylene chloride, chloroform, tetrachloroethylene, etc.), etc. in view of removal of reaction heat, easy handling of the polymer produced, or the like. Depending on the kinds of the polymerization initiator employed, it is sometimes useful to use ethers such as diethylether, dibutyl ether, dioctyl ether, ethylene glycol dimethyl ether, diethylene glycol dimethyl ether, tetrahydrofuran, etc.; esters such as methyl acetate, ethyl acetate, isopropyl acetate, methyl benzoate, etc.; ketones such as acetone, methyl ethyl ketone, methyl isobutyl ketone, etc. as appropriate in addition to the above-mentioned solvents to carry out the polymerization effectively. The reaction normally proceeds in 1 second to 100 hours. After the polymerization reaches the desired degree, it is terminated by a known method, and the polymer is isolated and purified.

The polymer having the repeating unit(s) (II) and/or (III) can be produced by subjecting a mixture of a compound of the formula (VI) above and a compound of the following formula (VII)

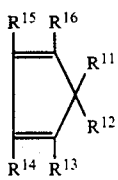
(VII)

wherein $R^{11-16}$ are as defined above, to a polymerization in the same conditions as described above.

Various moldings obtainable from the polymer (A) disintegrate themselves naturally due to decrease of the molecular weight and lowering of the mechanical properties thereof with time when used in atmosphere, soil or water.

The decrease of the molecular weight with time can be manipulated (suppressed) by containing a phenol compound of the formula (IV) in the polymer (A). Alternatively, by adding the phenol compound, the decomposition rate of the polymer (A) comprised in the polymer composition (B) can be manipulated according to the amount contained, the species of the phenol compound, etc., while maintaining the characteristic properties of the polymer (A).

In the above-mentioned formula (IV) showing the phenol compounds, the lower alkyl represented by $R^7$, $R^8$, $R^9$ and $R^{10}$ can be exemplified by methyl, ethyl, n-propyl, isopropyl, n-butyl, isobutyl, sec-butyl, tert-butyl, or the like. At least one of $R^7$ and $R^8$ is tert-butyl, and it is preferable that both be tert-butyl. Examples of an organic group represented by X include the following groups of 1 to 4 valences.

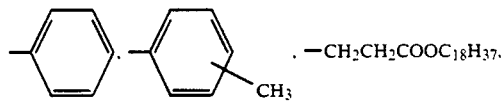

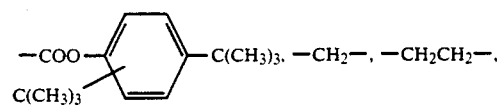

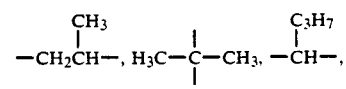

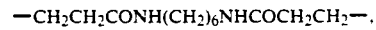

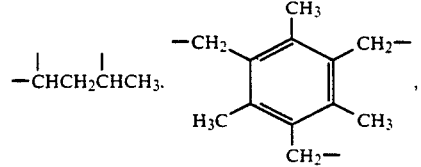

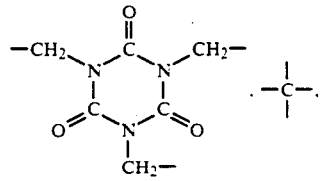

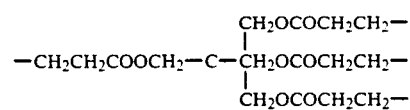

As the preferable phenol compounds, the following can be mentioned.

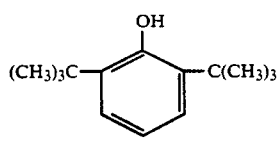
(1)

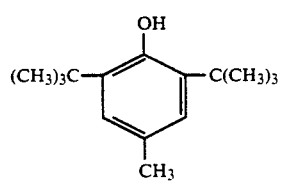
(2)

-continued
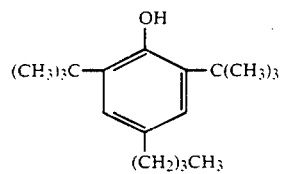 (3)
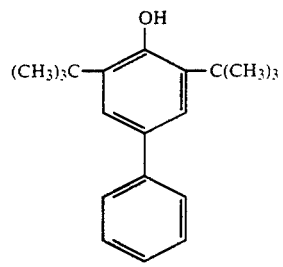 (4)
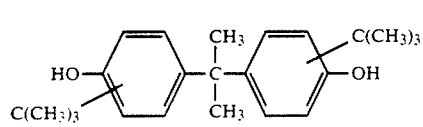 (5)
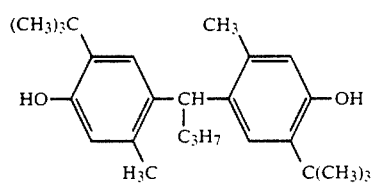 (6)
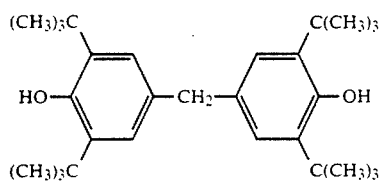 (7)
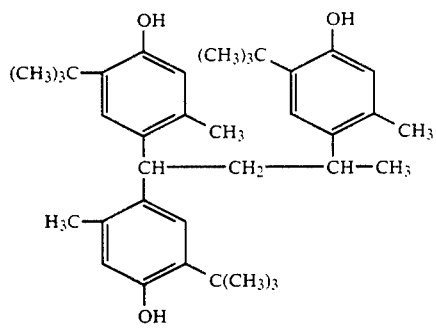 (8)
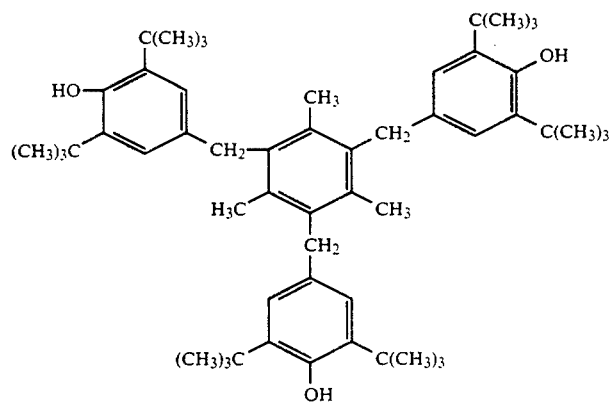 (9)

-continued
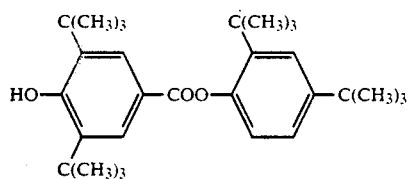 (10)
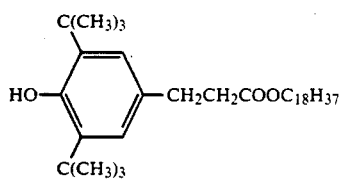 (11)
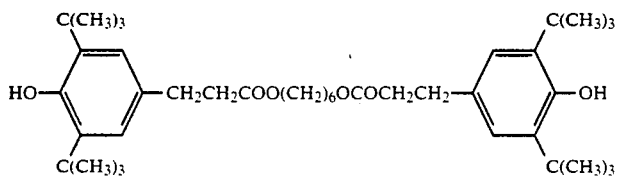 (12)
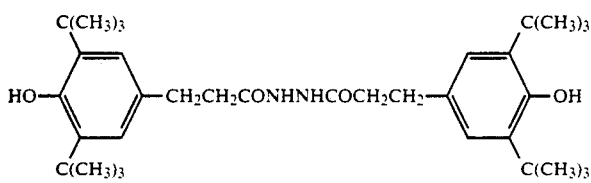 (13)
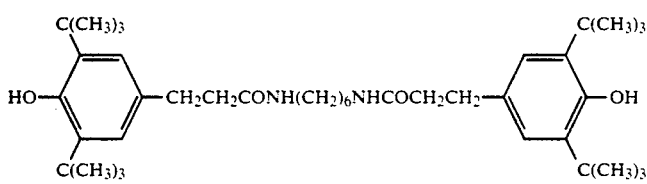 (14)
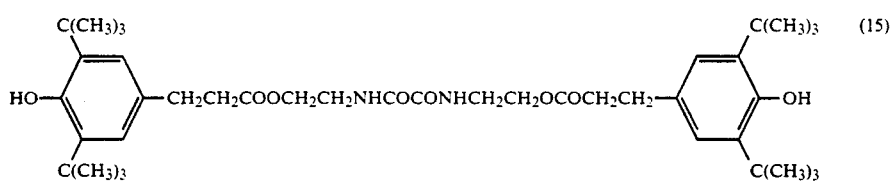 (15)
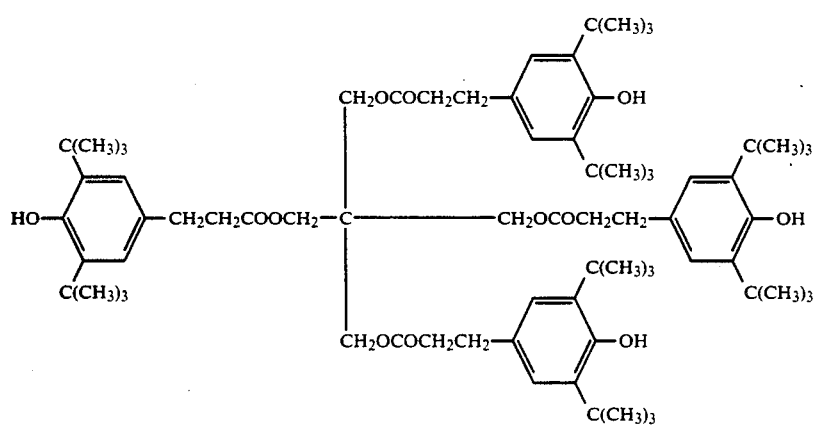 (16)

-continued (17)

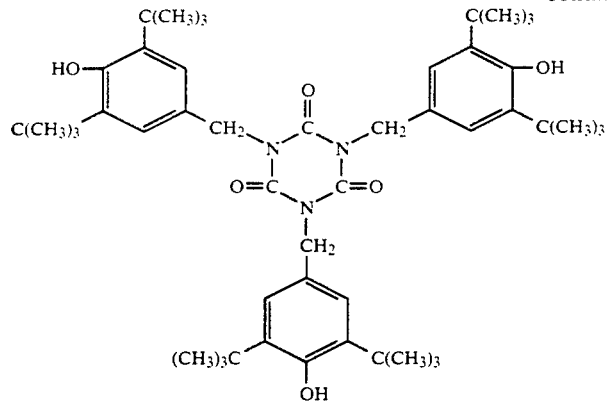

Specifically preferred compounds among above are shown below.

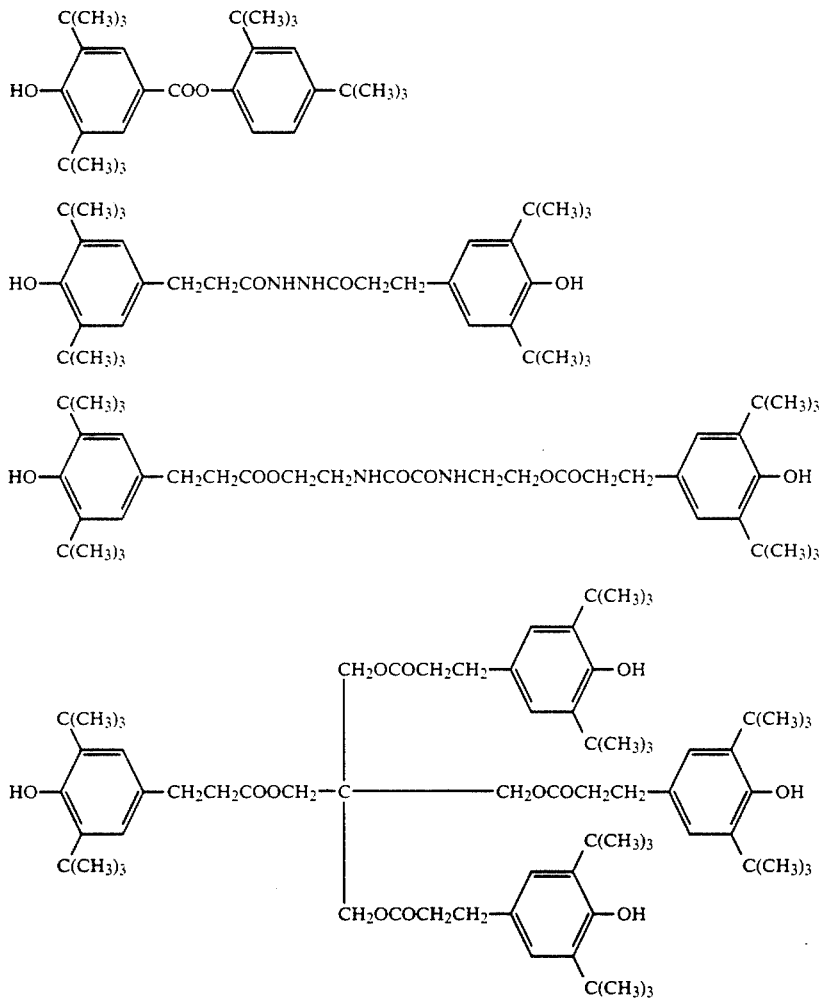

The proportion of the phenol compound to the polymer (A) in the polymer composition (B) is normally in the range between 10 and 50,000 ppm, preferably between 50 and 25,000 ppm and more preferably between 100 and 15,000 ppm. In case where the proportion is below 10 ppm, age stability of the polymer (A) tends to show no significant improvement, and in case where it is beyond 50,000 ppm, age stability of the polymer (A) does not improve sufficiently as compared with that in case of the above-mentioned ppm range, but mechanical properties or optical properties of various moldings the obtained polymer composition affords tend to lower, resulting in disadvantageous high production cost of the polymer composition.

The preparation of the polymer composition (B) is conducted by mixing the polymer (A) with a phenol compound by a method selected ad libitum. The mixing methods include, for example, a method wherein the solid-state polymer (A) is mechanically mixed with a phenol compound, a method wherein a phenol compound is mixed with the polymer (A) dissolved in a suitable solvent, followed by removal of the solvent, a method wherein the polymer (A) and a phenol compound are independently dissolved in a suitable solvent and mixed, followed by removal of the solvent, a method wherein the polymer (A) is prepared in a molten state and mixed with a phenol compound, or the like. Further, a phenol compound may be mixed with a reaction mixture containing the polymer (A) obtained from a compound of the formula (VI) described above, and the polymer composition (B) comprising the polymer (A) and the phenol compound is isolated.

The polymer composition (C) can be formed into a variety of moldings such as films, sheets, fibers, etc. having sufficient mechanical strength and flexibility, and strong resistance against bending, while retaining the characteristics of the polymer (A).

Examples of the plasticizer comprised in the polymer composition (C) include phthalate plasticizers such as dimethyl phthalate, diethyl phthalate, di-n-butyl phthalate, diisobutyl phthalate, dihexyl phthalate, dicyclohexyl phthalate, diheptyl phthalate, di-n-octyl phthalate, di-2-ethylhexyl phthalate, diisooctyl phthalate, dinonyl phthalate, di-n-decyl phthalate, diisodecyl phthalate, diundecyl phthalate, di-n-lauryl phthalate, di-tridecyl phthalate, methyloleyl phthalate, butyloctyl phthalate, butylisodecyl phthalate, butyllauryl phthalate, n-octyl n-decyl phthalate, isooctylisodecyl phthalate, butylbenzyl phthalate, butylphthalyl butylglycolate, ethylphthalyl ethylglycolate, di-2-ethylhexyl isophthalate, etc.; trimellitate plasticizers such as tri-2-ethylhexyl trimellitate, tri-n-octyl trimellitate, triisooctyl trimellitate, triisodecyl trimellitate, etc.; pyromellitate plasticizers such as tetra-n-octyl pyromellitate, tetra-2-ethylhexyl pyromellitate, etc.; fatty acid ester plasticizers such as di-2-ethylhexyl succinate, diisodecyl succinate, di-n-octyl adipate, di-2-ethylhexyl adipate, di-3,5,5-trimethylhexyl adipate, di-n-decyl adipate, diisodecyl adipate, dicapryl adipate, dimethoxyethyl adipate, dibutoxyethyl adipate, di-2-ethylhexyl azelate, diisodecyl azelate, dibutyl sebacate, di-2-ethylhexyl sebacate, diisodecyl sebacate, di-2-ethylhexyl dodecanedioate, dioctyl brassidate, di-n-octyl tetrahydrophthalate, di-2-ethylhexyl tetrahydrophthalate, diisodecyl tetrahydrophthalate, tributyl acetylcitrate, etc.; phosphate ester plasticizers such as tributyl phosphate, tributoxyethyl phosphate, trioctyl phosphate, diphenyloctyl phosphate, tricresyl phosphate, diphenyl cresyl phosphate, triphenyl phosphate, diphenyl isopropylphenyl phosphate, etc.; polyvinyl ether plasticizers such as polyvinyl methyl ether, polyvinyl butyl ether, polyvinyl isobutyl ether, etc.; polyester plasticizers such as those obtained in condensation polymerization of adipic acid with diols (e.g. ethylene glycol, 1,4-butanediol, neopentylglycol, etc.); epoxy plasticizers such as epoxy soybean oil, epoxy linseed oil, epoxy fish oil, epoxy middle-chain fatty acid ester, fatty acid ester of epoxy tall oil, epoxy castor oil, epoxy sunflower oil, fatty acid ester of epoxy linseed oil, epoxy polybutadiene, methyl epoxystearate, butyl epoxystearate, 2-ethylhexyl epoxystearate, octyl epoxystearate, stearyl epoxystearate, tris(epoxypropyl)isocyanurate, 3-(2-xenoxy)-1,2-epoxypropane, bisphenol A diglycidyl ether, vinylcyclohexene diepoxide, condensation polymers such as a polymer of 2,2-bis(4-hydroxyphenyl)propane and epichlorohydrin, etc., or the like. There may be used only one species, or 2 or more species of the plasticizers may be mixed for use.

Specifically preferred plasticizers include phthalate plasticizers and trimellitate plasticizers.

The proportion of the plasticizer in the polymer composition (C) is normally in the range of 1-80 weight parts, preferably 5-50 weight parts, and more preferably 10-30 weight parts per 100 weight parts of the polymer (A). In case where the proportion of the plasticizer is below 1 weight part, the flexibility of the various moldings which the polymer composition thus obtained affords is not sufficient, while in case where it is beyond 80 weight parts, the various moldings which the polymer composition thus obtained affords become too soft, resulting in greasiness.

The preparation of the polymer composition (C) is conducted by mixing the polymer (A) with a plasticizer by a method selected ad libitum. The mixing methods include, for example, a method wherein a plasticizer is mixed with the polymer (A) dissolved in suitable solvents, followed by removal of the solvent, a method wherein the polymer (A) and a plasticizer are independently dissolved in a suitable solvent and mixed, followed by removal of the solvent, a method wherein the polymer (A) is made into a molten state and mixed with a plasticizer, a method wherein a solid plasticizer is mechanically mixed with the polymer (A), or the like. Further, a plasticizer may be mixed with a reaction mixture containing the polymer (A) obtained from the compound of the formula (VI) described above and the polymer composition comprising the polymer (A) and the plasticizer is isolated.

The polymer composition (D) comprising the polymer (A), a phenol compound and a plasticizer mentioned above copossesses the characteristics of the polymer compositions (B) and (C). Species, containing ratio and a method of mixing the phenol compound and the plasticizer with the polymer (A) are the same as in the polymer compositions (B) and (C).

In the present invention, the polymer (A), the polymer composition (B), the polymer composition (C) or the polymer composition (D) may be contained in a thermoplastic polymer normally employed, thereby affording the decomposability with time to said thermoplastic composition.

The thermoplastic polymer [hereinafter abbreviated as polymer (E)] is those possessing thermoplasticity in the temperature range between 50° C. and 320° C. Examples of the polymer (E) include polyolefins such as polyethylene, polypropylene, ethylene-propylene copolymer, polymethylpentene, ethylene-octene copolymer, polystylene, etc.; polyamides such as nylon 6, nylon 66, etc.; polyesters such as polyethylene terephthalate, polybutylene terephthalate, polyarylate, etc.; polyvinyl alcohol; ethylene-vinyl alcohol copolymer; polyacrylonitrile; acrylonitrile copolymer; polyvinyl chloride; polyvinylidene chloride; polymethyl methacrylate; polycarbonate; or the like. Among those, polyolefins are preferable in view of cost, mechanical properties of the films or sheets or containers obtained therefrom, or the like.

As the polymer (E), there may be used only one species, or 2 or more species may be mixed for use.

The weight ratio of the polymer (A) and the polymer (E) is in the range between 5:95 and 95:5, preferably 20:80 and 80:20.

The polymers or the polymer compositions used in the invention may contain various additives such as lubricants, pigments, dyes, antistatic agents, ultraviolet light absorbers, or the like.

As the moldings, there may be mentioned films or sheets (e.g. those for various packagings, building materials, electrical components, optical components, etc.), tapes (e.g. those for binding racks and stems of fruit-trees such as grape, etc., those for binding stems of vegetables for inducement, etc., those for grafting used at the conjugation site of a rootstock and a scion), bands (e.g. those for placing bags for protection against fruit moths), fibers, products made of said fibers (e.g. papers, nonwoven fabrics, knit fabrics, fiber sheets made of nonwoven fabric containing resin, etc.), containers (e.g. boxes, cartons, sacks, cups, bottles, tubs, pots, etc.), or the like.

Various moldings obtainable from the polymer and the polymer compositions of the present invention disintegrate themselves naturally due to decrease of the molecular weight of the polymer comprised therein with time in atmosphere, soil or water, resulting in lowering of the mechanical properties, which leads to failure in maintaining the original shape in a certain period of time. The marked difference between the moldings of the present invention and decomposable polymers conventionally known rests in the fact that the moldings of the present invention decompose themselves in an environment with no direct irradiation of the sunlight such as inside of the buildings or underground as well as under irradiation of the sunlight.

Thus, the moldings of the present invention can be used as an indicator which shows the change of appearance and the lowering of the mechanical strength as the decomposition proceeds.

The moldings can be produced by a method known per se selected according to the objective moldings. Further, the mechanical properties of the moldings can be improved by an orientation according to a known method.

EXAMPLES

The invention is hereinafter described in detail by illustrating the examples. The physical properties were determined by the following methods.

① Number-average molecular weight and molecular weight distribution were determined by GPC (relative to standard polystyrene).
② Glass transition temperature was measured by a differential thermal analysis (in nitrogen, rate of temperature rise: 10° C./min.).
③ Tensile strength and tensile modulus were measured with a tensiometer at a grip distance of 30 mm and tension rate of 1 mm/min.
④ Light transmission was measured at a wavelength of 400 nm using a spectrophotometer.
⑤ Total light transmission was measured by a method according to ASTM D1003.

REFERENCE EXAMPLE 1

After sufficient displacement of a 10 l-glass vessel equipped with a mechanical stirrer, with a dry nitrogen gas, anhydrous toluene (7 l), anhydrous ethyl acetate (700 ml) and ethyl aluminum dichloride in n-hexane (concentration: 1 mole/l, 60 ml) were placed therein, followed by cooling to 0° C. Thereto was gradually added anhydrous 2,3-dihydrofuran (1400 g) over 4 hours while stirring. After 2 hours' stirring at 0° C., 1N ammonia water in methanol (233 ml) was added to the reaction mixture for termination of the polymerization. Thereafter, toluene (7 l) was mixed therewith, and the resulting mixture was dropwise added to methanol (70 l), and subjected to reprecipitation by a conventional method to give 1330 g of white product. The number-average molecular weight of the obtained product was 150,000 and the molecular weight distribution was 1.7.

The product was prepared into a chloroform-d solution and the NMR spectrum thereof was measured by $^1$H-NMR. As a result, there were found 2 absorptions occupying the same area on the spectrum at 1.9 ppm and 3.8 ppm. The latter absorption can be assigned to protons of methyn and methylene adjacent to oxygen and the former can be assigned to protons of methyn and methylene other than the above.

The product was dissolved in tetrahydrofuran, and the resulting solution was then prepared into an 8 μm-thick film on a Teflon sheet. The infrared absorption spectrum thereof was measured, and there were found absorptions at wavelengths of 910 cm$^{-1}$ and 1,060 cm$^{-1}$ attributable to —C—O—C—, as in the case with 2,3-dihydrofuran. Note that the absorption caused by the double bond at 1,630 cm$^{-1}$ in the case of 2,3-dihydrofuran had disappeared.

Based on the above results, it was confirmed that the product was a polymer having the following repeating unit, wherein 2,3-dihydrofuran had been polymerized by endocyclic double bonds without opening the 5-membered ring.

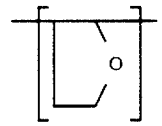

The glass transition temperature of the polymer was 140° C.

REFERENCE EXAMPLE 2

The same polymerization and isolation as in Reference Example 1 except that a mixture of 2,3-dihydrofuran (980 g) and 2,3-dihydro-2,2-dimethylfuran (420 g) was used in place of 2,3-dihydrofuran (1400 g) was conducted to give 1,340 g of a white product. The analysis by $^1$H-NMR confirmed that the product was a polymer comprising 68 weight % of the following repeating unit (VIII) and 32 weight % of the following repeating unit (IX).

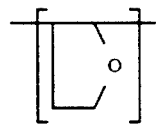
(VIII)

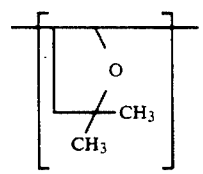
(IX)

The glass transition temperature of the polymer was 152° C.

REFERENCE EXAMPLE 3

The same procedure as in Reference Example 2 was repeated to give a polymer comprising 80 weight % of the repeating unit (VIII) and 20 weight % of the repeating unit (IX).

EXAMPLE 1

The polymer (20 g) obtained in Reference Example 1 and di-2-ethylhexyl phthalate (6 g) were dissolved in toluene (200 ml), and the toluene was removed by a rotary evaporator. The polymer composition thus obtained was formed into a film of 100 mm × 100 mm × 0.1 mm by a thermal pressing machine (Shinto Kinzoku Kogyosho) at 280° C. and at 50 kg/cm². The film was flexible and resistant to bending. The glass transition temperature of the film was 43° C. The tensile strength was 2.4 kg/mm², the tensile modulus was 127 kg/mm² and the light transmission was 86%. The film was subjected to irradiation for 200 hours in a sunshine weatherometer. As a result, the tensile strength decreased to as low as 20% of before the irradiation. The film was left outdoor for 40 days, and its original shape was almost destroyed.

EXAMPLE 2

The polymer (50 g) obtained in Reference Example 1 and di-n-octyl phthalate (5 g) were mixed and kneaded in Labo Plastomill (Toyo Seiki Seisakusho, 20R-200 type) at 240° C. for 10 minutes. The thus-obtained polymer composition was formed into a film in the same manner as in Example 1. The film was flexible and resistant to bending. The tensile strength was 4.5 kg/mm² and the tensile modulus was 197 kg/mm². The film was subjected to irradiation for 200 hours in a sunshine weatherometer. As a result, the tensile strength decreased to as low as 24% of before the irradiation. The film was left indoor for 120 days, which induced decrease of the molecular weight to 31% of before leaving. Further, the film was left in the ground for 100 days, which reduced the molecular weight to 25% of before leaving.

EXAMPLE 3

The same procedure as in Example 1 except that the polymer (20 g) obtained in Reference Example 2 was used in place of the polymer (20 g) obtained in Reference Example 1 and triisooctyl trimellitate (5 g) was used in place of the di-2-ethylhexyl phthalate (2 g), was repeated to give a polymer composition, which was then formed into a film. The film was flexible and resistant to bending. The film showed the tensile strength of 2.0 kg/mm², the tensile modulus of 197 kg/mm² and the light transmission of 85%. Subsequently, the film was irradiated in a sunshine weatherometer for 200 hours. As a result, the molecular weight decreased to 18% of before the irradiation.

EXAMPLE 4

A film formed in the same manner as in Example 1 was slit into tapes of 100 mm × 10 mm. The thus-obtained tape was used as a binding tape. Using a stem of a pumpkin before having a true leaf as a rootstock, a stem of a tomato nursery stock having 1 or 2 true leaves was grafted. Two weeks later, the pumpkin and the tomato took roots, and 1 month later, the tape had fallen down by itself from the graft part.

EXAMPLE 5

The polymer obtained in Reference Example 1 was formed into a film of 100 mm × 100 mm × 0.2 mm by a thermal pressing machine (Shinto Kinzoku Kogyosho) at 280° C. and at 50 kg/cm². The film showed the tensile strength of 5.2 kg/mm² and the tensile modulus of 220 kg/mm². The film was then subjected to a biaxial stretching by a biaxial stretching apparatus (Toyo Seiki Seisakusho, X6H-type) by 2 × 2 at 150° C. and at a rate of 0.5 m/min. to give a 49 μm-thick stretched film. The film had a smooth surface and fine transparency with the light transmission of 89%. The film showed the tensile strength of 7.8 kg/mm², the tensile modulus of 317 kg/mm² and the elongation at breakage of 7.0%. The mechanical properties were measured at two directions crossing at right angles and almost the same results were obtained.

A bag of 8 cm × 5 cm was made of the stretched film. An outdoor exposure test of the bag was conducted from May to June and the results are summarized in Table 1.

EXAMPLE 6

A 7 cm × 7 cm × 5 cm pot for raising seedlings was formed with the stretched film prepared in the same manner as in Example 5. The pot had been buried in the ground for 3 months before it was taken out. The pot was completely disintegrated.

EXAMPLE 7

To the polymer (10 g) obtained in Reference Example 1 was added tetrakis[methylene-3-(3',5'-di-tert-butyl-4'-hydroxyphenyl)propionate]methane [Compound (16), 0.1 g] under stirring in a mixer, followed by forming and stretching as in Example 5 to give a film. The film had a smooth surface and fine transparency with the light transmission of 90%. The film showed the tensile strength of 7.9 kg/mm², the tensile modulus of 320 kg/mm² and the elongation at breakage of 7.2%. The mechanical properties were measured at two directions crossing at right angles and almost the same results were obtained.

A bag was prepared from this film and was subjected to a decomposability test in the same manner as in Example 5. The results are summarized in Table 1.

EXAMPLE 8

A bag was prepared using the polymer obtained in Reference Example 2 and was subjected to a decomposability test in the same manner as in Example 5. The results are summarized in Table 1.

TABLE 1

| Example | Test time (days) | Light transmission (%) | Tensile strength (kg/mm²) |
|---|---|---|---|
| Example 5 | 0 | 89 | 7.8 |
|  | 30 | 43 | 3.7 |
|  | 50 | Crack occurs, unmeasurable | |
| Example 7 | 0 | 90 | 7.9 |
|  | 30 | 88 | 5.1 |
|  | 50 | 87 | 3.9 |
| Example 8 | 0 | 88 | 6.7 |
|  | 30 | 50 | 4.7 |
|  | 50 | Crack occurs, unmeasurable | |

EXAMPLE 9

A polymer composition was obtained by mixing the polymer (number-average molecular weight: 83,100, 10 g) obtained in accordance with Reference Example 1 and tetrakis[methylene-3-(3',5'-di-tert-butyl-4'-hydroxyphenyl) propionate]methane [Compound (16), 0.1 g] under stirring in a mixer.

The thus-obtained polymer composition was formed into a plate of 100 mm×20 mm×1 mm by a thermal pressing machine, which was then left standing in a Geer oven at 100° C. for 200 hours. Thereafter, the light transmission and the bending strength were measured. The results are as follows.

|  | light transmission (%) at 400 nm | bending strength (kg/cm²) |
| --- | --- | --- |
| before leaving | 82 | 1250 |
| after leaving | 80 | 1230 |

In the same manner as above, a speciment was obtained from a polymer not containing tetrakis[methylene-3-(3′,5′-di-tert-butyl-4′-hydroxyphenyl)propionate]methane [Compound (16)]. Then the specimen was left standing in a Geer oven at 100° C. for 200 hours. The light transmission and the bending strength were 51% and 892 kg/cm², respectively.

EXAMPLE 10

The same procedure as in Example 9 except that the compounds (10) and (16) were used in place of the compound (16) in an amount of 5,000 ppm respectively, was repeated to give specimens. The specimens were then left standing in a Geer oven at 100° C. for 200 hours or subjected to irradiation in a sunshine weatherometer for 200 hours. Thereafter, the light transmission at 400 nm and the bending strength were measured. The results are as follows.

|  | light transmission (%) at 400 nm | bending strength (kg/cm²) |
| --- | --- | --- |
| Geer oven | 80 | 1163 |
| Weatherometer | 82 | 1198 |

EXAMPLE 11

A polymer composition was prepared from the polymer (10 g) obtained in Reference Example 1 and the compound (15) (0.1 g) in the same manner as in Example 9. The thus-obtained polymer composition was formed into a film of 100 mm×100 mm×0.1 mm by a thermal pressing machine, which was subjected to 100 hours' irradiation in a sunshine weatherometer. As a result, the molecular weight decreased to 58% of before the irradiation and the tensile strength decreased to 50% of before the irradiation. The film was left indoor for 300 days, which induced decrease of the molecular weight to 87% of before leaving.

Further, the same experiment was conducted using the polymer not containing the compound (15). The obtained molecular weight and tensile strength after the irradiation were 25% and 26% of before the irradiation, respectively.

EXAMPLE 12

A polymer composition was obtained from the polymer (50 g) obtained in Reference Example 1, di-n-octyl phthalate (20 g) and the compound (16) (0.5 g) in the same manner as in Example 1, and was then formed into a film. The film was left outdoor for 40 days, and the tensile strength decreased to 33% of before leaving.

EXAMPLE 13

The polymer obtained in Reference Example 1 was melt-spun by a small-sized extruder (inner diameter: 13 mm) with a spinneret having 12 holes (inner diameter: 0.25 mm). That is, the system was displaced with a dry nitrogen gas, and in the hopper was placed powders of the dry polymer while shutting off the air by a nitrogen gas flow. The spinning was conducted with the temperatures at the preheat zone, middle zone, melt zone and spinneret being 200° C., 280° C., 285° C. and 285° C., respectively, with the use of a gear pump at the objective extruder output of 5.5 g/min. and take-up rate of 450 m/min. The spinning properties were fine and transparent fibers were obtained. The fibers thus obtained were subjected to heat stretching in a dry heat at 170° C. into 3.2-fold fibers. Thus, there were obtained fibers of 2.6 denier fineness, 2.2 g/denier strength and 8.7% elongation at breakage.

EXAMPLE 14

The polymer obtained in Reference Example 3 was melt-spun in the same manner as in Example 1 with the use of a small-sized extruder, and the obtained fibers were subjected to dry heat stretching at 170° C. into 3.3-fold fibers to give fibers of 2.7 denier fineness, 2.1 g/denier strength and 5.8% elongation at breakage.

EXAMPLES 15-17

The polymer obtained in Reference Example 1 and high fluidity polypropyrene with a melt index of 7.1 g/10 min. (hereinafter abbreviated as PPr) were mixed, and melt-spun with the use of a small-sized extruder in the same conditions as in Example 13, and the obtained fibers were subjected to dry heat stretching into 3.5-fold fibers at 160° C. The fiber properties are summarized in Table 2.

TABLE 2

| Fiber sample | Mixing ratio (%) Polymer | Mixing ratio (%) PPr | Fineness (dr) | Strength (g/dr) | Elongation (%) | Weather resistance[1] |
| --- | --- | --- | --- | --- | --- | --- |
| Ex. 15 | 100 | 0 | 2.8 | 2.2 | 7.3 | unmeasurable |
| Ex. 16 | 75 | 25 | 2.4 | 2.7 | 17 | unmeasurable |
| Ex. 17 | 30 | 70 | 2.3 | 3.1 | 29 | ca. 13% |

[1]Retention of elongation at fiber breakage after 200 hours' exposure in a weatherometer.

The fibers of Example 15-17 could be efficiently put to use as the disintegratable fibers.

EXAMPLE 18

The fibers obtained in Example 13 were cut into 5 mm fiber length, which was mixed with unacetalated polyvinyl alcohol fiber (Kuraray Co. Ltd., grade: VPB 105-2, fineness: 1 denier, fiber length: 3 mm) as a binder fiber at a ratio of 85% of the former to 15% of the latter. The mixed fibers were dispersed in water, subjected to beating treatment, and made into paper by a conventional method using a Yankee paper machine.

The obtained paper had weight of 49.6 g/m² and density of 0.37 g/cm³, and could be used as a wrapping paper.

The number-average molecular weight of the polymer constituting the fiber lowered to about 25% after 40 days' outdoor exposure, to the extent where the shape of the paper was lost into powders.

EXAMPLE 19

The fibers obtained in Example 14 were mechanically crimped, cut into 51 mm fiber length and formed into a fiber web of 70 g/m² of average weight by a card and a random webber. Two sheets of the fiber web were laminated, and subjected to a needle punch treatment with a No. 40 needle at the punch density of 240 punch/cm² from both sides to give a fiber cohesive nonwoven fabric (average weight: 146 g/m², apparent density: 0.14 g/cm³, thickness: 0.1 mm).

By adding activator, fats and oils, etc. thereto, the fabric was made into an nonwoven fabric for a wiping use. Fifty days' outdoor exposure after use of the fabric induced decrease of the number-average molecular weight of the polymer constituting the fiber to about 23%, to the extent where the shape of the fabric was lost into powders.

EXAMPLE 20

The fibers obtained in Example 16 were mechanically crimped, cut into 51 mm fiber length and formed into a fiber web of 80 g/m² of average weight by a card and a random webber. Two sheets of the fiber web were laminated, and subjected to a needle punch treatment with a No. 40 needle at the punch density of 140 punch/cm² from both sides to give a fiber cohesive nonwoven fabric (average weight: 173 g/m², apparent density: 0.13 g/cm³, thickness: 1.3 mm). This fabric was immersed in an aqueous solution of low sapofication polyvinyl alcohol to allow the amount corresponding to 30% of the polyvinyl alcohol relative to the fiber weight, attached thereto, followed by drying to give a fiber sheet. The sheet was press-formed into a pot for raising seedlings, in which vegetable seeds were sown. The seeds were allowed to germinate, followed by seedling culture in a green house. About 1 month later, it was planted without removing the pot. The pot maintained the original shape at the time of planting but became disintegrated 3 months later.

EXAMPLE 21

The polymer (30 g) obtained in Reference Example 1 and polymethyl methacrylate (Kuraray Co., Ltd., H1000B, 30 g) were mixed and kneaded in Labo Plastomill (Toyo Seiki Seisakusho, 20R-200 type) at 240° C. for 10 minutes. The thus-obtained polymer composition was formed into a film of 100 mm×100 mm×0.05 mm by a thermal pressing machine at 240° C. and at 50 kg/cm². The film showed the tensile strength of 6.50 kg/mm².

A bag of 4 cm×3 cm was made of the film. An outdoor exposure test of the bag was conducted from May and the bag was completely disintegrated 4 months later.

We claim:

1. A disposable molding comprising a composition containing polymer (A) selected from the group consisting of polymer composition (B), polymer composition (C) and polymer composition (D), wherein:
    polymer (A) has a repeating structure unit in the main chain represented by the formula (I)

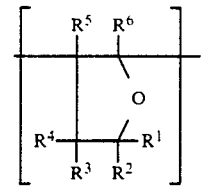

(I)

wherein $R^1$, $R^2$, $R^3$, $R^4$, $R^5$ and $R^6$ are respectively a hydrogen atom or a lower alkyl;

wherein polymer composition (B) comprises the polymer (A) and a phenol compound of the formula (IV)

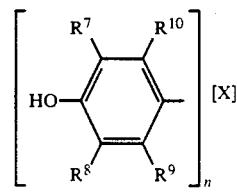

(IV)

wherein $R^7$, $R^8$, $R^9$ and $R^{10}$ are respectively a hydrogen atom or a lower alkyl, at least one of $R^7$ and $R^8$ is tert-butyl, X is a hydrogen atom or an organic group and n is an integer of 1 to 4 corresponding to the number of the bonding site of [X];

wherein polymer composition (C) comprises the polymer (A) and a plasticizer; and wherein polymer composition (D) comprises the polymer (A), a phenol compound of the formula (IV) and a plasticizer.

2. A disposable molding as claimed in claim 1 comprising the polymer composition (B) which comprises 10–50,000 ppm of a phenol compound relative to the polymer (A).

3. A disposable molding as claimed in claim 1 comprising the polymer composition (C) which comprises 1–80 weight parts of a plasticizer per 100 weight parts of the polymer (A).

4. A disposable molding as claimed in claim 1 wherein the plasticizer is at least one species selected from the group consisting of phthalate plasticizers, trimellitate plasticizers, pyromellitate plasticizers, fatty acid ester plasticizers, phosphate ester plasticizers, polyvinyl ether plasticizers, polyester plasticizers and epoxy plasticizers.

5. A disposable molding as claimed in claim 1 comprising the polymer composition (D) which comprises 10–50,000 ppm of a phenol compound relative to the polymer (A) and 1–80 weight parts of a plasticizer per 100 weight parts of the polymer (A).

6. A polymer composition comprising polymer (A) wherein the repeating unit in the main chain is represented by the following formula (I)

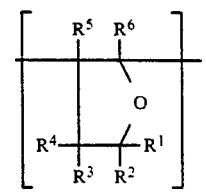

(I)

wherein $R^1$, $R^2$, $R^3$, $R^4$, $R^5$ and $R^6$ are respectively a hydrogen atom or a lower alkyl, and a plasticizer.

7. A polymer composition as claimed in claim 6, wherein the plasticizer is at least one species selected from the group consisting of phthalate plasticizers, trimellitate plasticizers, pyromellitate plasticizers, fatty acid ester plasticizers, phosphate ester plasticizers, polyvinyl ether plasticizers, polyester plasticizers and epoxy plasticizers.

8. A polymer composition comprising polymer (A) wherein the repeating unit in the main chain is represented by the following formula (I)

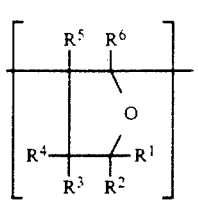

wherein $R^1$, $R^2$, $R^3$, $R^4$, $R^5$ and $R^6$ are respectively a hydrogen atom or a lower alkyl, and a phenol compound of the formula (IV)

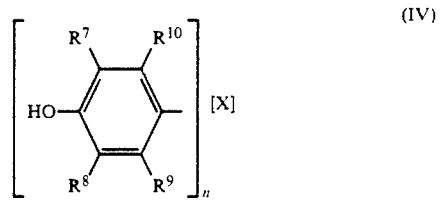

wherein $R^7$, $R^8$, $R^9$ and $R^{10}$ are respectively a hydrogen atom or a lower alkyl, at least one of $R^7$ and $R^8$ is tertbutyl, X is a hydrogen atom or an organic group and n is an integer of 1 to 4 corresponding to the number of the bonding site of [X].

* * * * *